United States Patent [19]
Hasegawa et al.

[11] Patent Number: 6,033,571
[45] Date of Patent: Mar. 7, 2000

[54] ACTIVATED SLUDGE TREATMENT METHOD AND APPARATUS

[75] Inventors: Susumu Hasegawa, Himeji; Masahiko Miura, Kobe; Kenji Katsura, Kobe; Hideki Yokoyama, Kobe; Akihiko Hogetsu, Kobe, all of Japan

[73] Assignee: Shinko Pantec, Co., Ltd., Hyogo, Japan

[21] Appl. No.: 09/005,112

[22] Filed: Jan. 9, 1998

[51] Int. Cl.⁷ .................................................... C02F 3/00
[52] U.S. Cl. ........................ 210/613; 210/623; 210/181; 210/195.1; 210/800
[58] Field of Search .................... 210/612, 613, 210/621, 622, 623, 629, 758, 800, 806, 181, 195.1, 205, 532.1

[56] References Cited

U.S. PATENT DOCUMENTS

| | | |
|---|---|---|
| 3,622,507 | 11/1971 | Pasveer . |
| 3,926,794 | 12/1975 | Vahldieck . |
| 4,141,822 | 2/1979 | Levin et al. . |
| 4,190,528 | 2/1980 | Dassen . |
| 4,203,838 | 5/1980 | Shimizu et al. . |
| 4,213,857 | 7/1980 | Ishida et al. . |
| 4,246,099 | 1/1981 | Gould et al. . |
| 4,582,607 | 4/1986 | Kiese et al. . |
| 4,915,840 | 4/1990 | Rozich . |
| 5,087,378 | 2/1992 | Kovacs . |
| 5,356,537 | 10/1994 | Thurmond et al. . |
| 5,360,546 | 11/1994 | Tomita et al. . |
| 5,725,772 | 3/1998 | Shirodkar . |

FOREIGN PATENT DOCUMENTS

WO 93/04988  3/1993  WIPO .

*Primary Examiner*—David A. Simmons
*Assistant Examiner*—Fred Prince
*Attorney, Agent, or Firm*—Marshall, O'Toole, Gerstein, Murray & Borun

[57] ABSTRACT

An activated sludge treatment apparatus having an aeration tank 14 for subjecting an organic waste water to an aerobic biological treatment, a first precipitation device 16 for separating a waste water treated in aeration tank 14 into treated water and a sludge, a recycle route 18 for returning a portion of the sludge separated by precipitation device 16 to aeration tank 14, a solubilizing treatment device 24 for solubilizing, at a high temperature, excess sludge separated by precipitation device 16, and a return route 30 for returning a treated solution solubilized by solubilizing treatment device 24 to aeration tank 14, is disclosed.

7 Claims, 2 Drawing Sheets

ACTIVATED SLUDGE TREATMENT METHOD AND APPARATUS

FIELD OF THE INVENTION

The present invention relates to an activated sludge-treatment method and apparatus capable of treating excess sludge discharged in a sewage treatment process, such as a sewage treatment plant, a night soil treatment plant, a waste water treatment process, like in a food factory or a chemical factory, and the like.

BACKGROUND OF THE INVENTION

Conventionally, an aerobic biological treatment method, which is referred to as an activated sludge method, has been performed for treating waste water most generally. This method is carried out as shown in FIG. 4, wherein organic waste water, such as sewage, introduced from an organic waste water reservoir 100 into an aeration treatment device 102 is decomposed into an inorganic matter, such as carbon dioxide or water, under aerobic conditions in aeration tank 102 by "biological oxidation," which is oxidative decomposition by a microorganism. The waste water which has been treated in aeration tank 102 is separated into treated water 106 and sludge 108 by a precipitation device 104. Usually, a portion of sludge 108 is returned as a microorganism source to aeration tank 102, and the residual sludge (corresponding to a quantity of increased sludge in aeration tank 102) is discharged as an excess sludge 110.

In this case, a concentrated solution (i.e., sludge) containing an organic precipitated solid, which is solid-liquid separated by the precipitation device, is treated through steps of concentration, digestion, dehydration, composting, and incineration. Therefore, such a treatment is not preferred because it requires large amounts of time and expense.

For this reason, methods of decreasing an excess sludge as much as possible, such as an extended aeration method for increasing the residence time of a sludge, and a fixed bed oxidation method having microorganisms attached to a catalytic material surface of a media to hold a large quantity of the microorganisms in a reaction vessel (see "Sewage Service Project—Design Guide and Explanation" issued by Japan Sewage Works Association, edited by Sewage Works Division, Municipal Department of the Ministry of Construction, Vol. 2, 1994), have been proposed and commercialized. However, these methods require a large site area for increasing a residence time. In the extended aeration method, the sludge is distributed when a load is reduced, thereby interfering with solid-liquid separation. In the fixed bed oxidation method, fouling of the sludge is caused when the load is increased. Therefore, these methods are not desirable.

In order to solve these problems, a method of temporarily storing an excess sludge and decreasing the sludge by an anaerobic digestion method to reduce the quantity of sludge and to lessen the waste treatment burden has been proposed. (See, "Sewage Service Project—Design Guide and Explanation" issued by Japan Sewage Works Association, edited by Sewage Works Division, Municipal Department of the Ministry of Construction, Vol.2, 1994.) In this method, treatment time is long, for example 20 to 30 days, and the decrease in organic sludge is not sufficient, for example about 30 to 50%.

Japanese Provisional Patent Publication No. 6-206088 discloses a method of performing an aerobic treatment on organic waste water, then oxidizing a solid-liquid separated sludge by an ozone oxidation column to reduce excess sludge. According to this method, however, handling of ozone is complicated, and residual ozone should be treated. The decomposition rate of the excess sludge is not sufficient in the ozone oxidation column.

SUMMARY OF THE INVENTION

In consideration of the foregoing, it is an object of the present invention to provide an activated sludge treatment method and apparatus capable of extensively reducing the quantity of excess sludge generated when treating organic waste water.

It is another object of the present invention to provide an activated sludge treatment method and apparatus capable of discharging a sludge containing a large ash content from a treatment system.

The activated sludge treatment method and apparatus according to the present invention solve the above-mentioned problems and achieve the above-mentioned objects, and are summarized in the following paragraphs (1) to (9).

(1) A first aspect of the present invention is directed to an activated sludge treatment apparatus for treating organic waste water, comprising an aeration tank for subjecting the organic waste water to aerobic biological treatment, a first precipitation device for separating a solution treated in the aeration tank into treated water and a sludge, a recycle route for returning a portion of the sludge separated by the precipitation device to the aeration tank, a solubilizing treatment device for solubilizing, at a high temperature, an excess sludge separated by the precipitation device, and a return route for returning the treated solution solubilized by the solubilizing treatment device to the aeration tank.

(2) A second aspect of the present invention is directed to the activated sludge treatment apparatus according to paragraph (1), wherein a heat exchanger, which heats the sludge which has been solid-liquid separated by the precipitation device with a treated solution solubilized by a solubilizing treatment device, is provided on a route leading from the precipitation device to the solubilizing treatment device.

(3) A third aspect of the present invention is directed to the activated sludge treatment apparatus according to paragraphs (1) or (2), wherein a second precipitation device, which separates the treated solution solubilized by the solubilizing treatment device into treated water to be returned to the aeration tank and an excess sludge, is provided on the return route for returning the treated solution to the aeration tank.

(4) A fourth aspect of the present invention is directed to the activated sludge treatment apparatus according to paragraph (3), further comprising an excess sludge return route for returning a portion of the excess sludge of the second precipitation device to the first precipitation device.

(5) A fifth aspect of the present invention is directed to an activated sludge treatment method for treating organic waste water, comprising the steps of subjecting the organic waste water to aerobic biological treatment by an aeration tank, and then separating a solution treated by the aeration tank into treated water and a sludge by a first precipitation device, returning a portion of the sludge separated by the precipitation device to the aeration tank through a recycle route, solubilizing, at a high temperature, an excess sludge separated by the precipitation device by a solubilizing treatment device, and returning the treated solution solubilized by the solubilizing treatment device to the aeration tank through a return route.

(6) A sixth aspect of the present invention is directed to the activated sludge treatment method according to paragraph (5), wherein the sludge which has been solid-liquid separated by the precipitation device is heated with a treated solution solubilized by a solubilizing treatment device through a heat exchanger provided on a route leading from the precipitation device to the solubilizing treatment device.

(7) A seventh aspect of the present invention is directed to the activated sludge treatment method according to paragraphs (5) or (6), wherein the treated solution solubilized by the solubilizing treatment device is separated into treated water to be returned to the aeration tank and an excess sludge in a second precipitation device provided on the return route for returning the treated solution to the aeration tank.

(8) An eighth aspect of the present invention is directed to the activated sludge treatment method according to paragraph (7), wherein a portion of the excess sludge of the second precipitation device is returned to the first precipitation device through an excess sludge return route.

(9) A ninth aspect of the present invention is directed to the activated sludge treatment method according to paragraphs (5) to (8), wherein the solubilizing treatment is performed at a temperature ranging from 50° C. to 90° C.

In accordance with the present invention, it has been found that organic waste water first is subjected to aerobic biological treatment, a treated solution then is solid-liquid separated into treated water and a sludge, and excess sludge thereafter is solubilized at a high temperature and is subjected again to the aerobic biological treatment, thereby extensively reducing the quantity of generated excess sludge.

DESCRIPTION OF THE PREFERRED EMBODIMENTS

Figure 1:
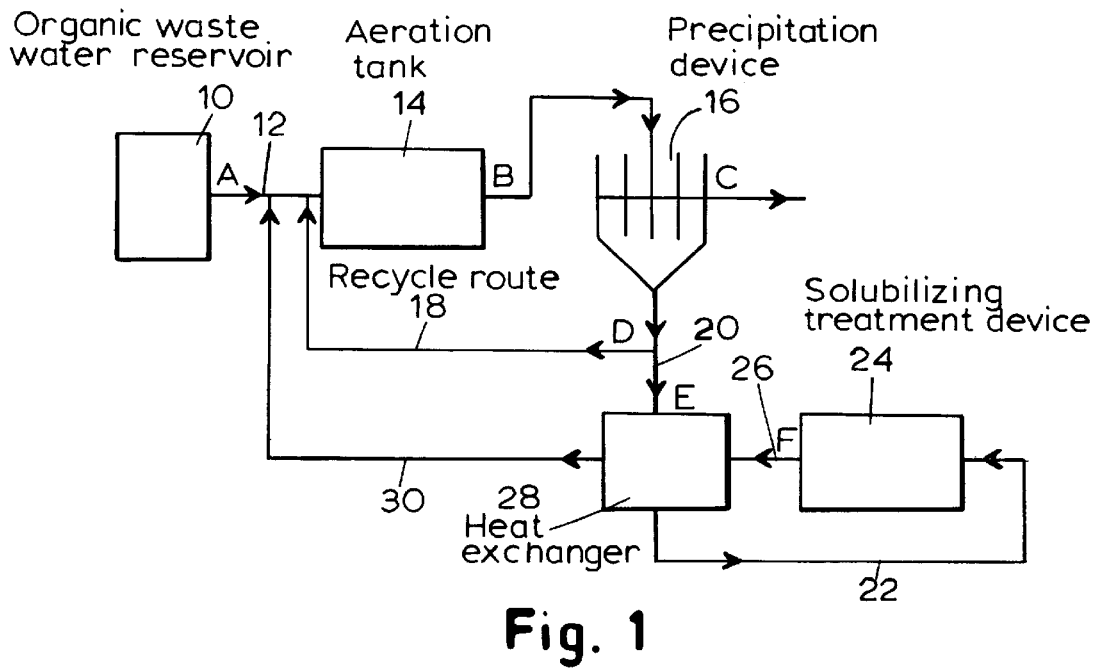
FIG. 1 is a schematic diagram showing an activated sludge treatment apparatus and method according to a first embodiment of the present invention.

FIG. 1 is a schematic diagram showing an activated sludge treatment apparatus and method according to a first embodiment of the present invention.

The present invention is directed to treating organic waste water, for example biodegradable organic waste water which is discharged in a sewage treatment process, such as a sewage treatment plant or a night soil treatment plant, a waste water treatment process, like in a food factory or a chemical factory, and the like.

As shown in FIG. 1, organic waste water A stored in an organic waste water reservoir 10 is introduced into an aeration treatment device 14 through a route 12, and is subjected to aerobic biological treatment in aeration tank 14. In this case, the aerobic biological treatment is performed in aeration tank 14 as follows. More specifically, organic matter is decomposed into inorganic matter, such as carbon dioxide or water, by "biological oxidation." An aerobic microorganism used is gram-negative or gram-positive bacillus, for example, the Pseudomonas species and the Bacillus species, which have been used in an activated sludge method for treating waste water. These inoculation bacteria are obtained from a usual waste water treatment plant.

In this case, the temperature of aeration tank 14 is set in a range of 10° C. to 50° C., usually 20° C. to 30° C. In order to perform the treatment more efficiently, a high temperature is preferred. For example, in the case where mesophile bacteria separated from an excess sludge from a sewage treatment plant are used, the operation is performed at a temperature of 35° C. to 40° C. In any case, the operation should be performed by selecting an optimum temperature condition from the temperature range mentioned above such that a microorganism performs the oxidation decomposition reaction efficiently and fully. The structure of aeration tank 14 for performing aerobic microorganism decomposition is not particularly restricted. In short, a device provided with a diffuser in a reaction vessel can be used. In this case, the reaction vessel can be a batch type or a continuous type.

Subsequently, water B treated in aeration tank 14 is introduced into a precipitation device 16 and is solid-liquid separated. A supernatant solution C which has been solid-liquid separated is subjected to tertiary treatment such as denitrification or ozone treatment according to the regulations of a discharge destination, if necessary. The solution thus treated is reused or utilized for river discharge.

On the other hand, a portion D of a sludge separated by precipitation device 16 joins route 12 through a recycle route 18 and is introduced into aeration tank 14 together with organic waste water A.

The quantity of recycled sludge is determined according to the quantity of microorganisms present in aeration tank 14.

Furthermore, a residual excess sludge E separated by precipitation device 16 (which corresponds to a quantity of the increased sludge in aeration tank 14) is introduced into a solubilizing treatment device 24 through routes 20 and 22. Solubilizing treatment device 24 solubilizes an organic sludge anaerobically or aerobically at a high temperature. In this case, inoculation bacteria (i.e., thermophilic bacteria) of an anaerobic or aerobic microorganism which are to be used at a high temperature are obtained by incubating the microorganism in an aerobic or anaerobic digesting vessel according to the prior art, for example.

While an optimum temperature of solubilizing treatment device 24 is preferably 50° C. to 90° C., the temperature is varied depending on the kind of the thermophilic bacteria for decomposing an organic solid is contained in the excess sludge E to be treated at a high temperature. For example, in case of the thermophilic bacteria separated from an excess sludge from a sewage treatment plant, the optimum temperature is set at 60° C. to 80° C., and preferably 70° C., in such a manner that the solubilizing reaction by the microorganism (thermophilic bacteria) and physiochemically thermal decomposition by heat can be fully performed and efficiently at the same time. In any case, the temperature can be set at 50° C. to 90° C., depending on the type of microorganism in such a manner that the solubilizing reaction by the microorganism (thermophilic bacteria) and the physiochemically thermal decomposition by heat can be fully performed simultaneously and efficiently.

Furthermore, a device for aerobic biological digestion which acts as solubilizing treatment device 24 can be provided with a diffuser according to the prior art, and a device for anaerobic biological digestion can be provided with (1) a method for stirring, by circulation, a solution in a vessel, (2) a method for stirring, by circulating, and aerating a generated gas, (3) a method for providing an agitator, such as a stirring blade, and (4) means for efficiently causing an activated microorganism to come in contact with a sludge to be treated, for example, activated microorganism fixing means. In this case, a reactor can be a batch type or a continuous type.

Thus, a solution F which has been solubilized by solubilizing treatment device 24 is caused to join route 12 through a route 26, a heat exchanger 28 provided on route 20, and a route 30, and then is introduced into aeration tank 14, together with organic waste water A, such that aerobic biological treatment is performed. Thus, a treatment cycle is repeated as described above.

In heat exchanger 28, excess sludge E which has been solid-liquid separated by precipitation device 16 is heated with solution F solubilized by solubilizing treatment device 24, thereby minimizing heat loss.

If solution F is solubilized by solubilizing treatment device 24, solids are reduced. If the solubilized solution is introduced into aeration tank 14 to perform the aerobic biological treatment, a solubilized portion is decomposed so that a part thereof is changed into a sludge composed of microorganisms. As a result, the sludge increases in aeration tank 14. Consequently, if the excess sludge is solubilized by solubilizing treatment device 24 in consideration of an increased quantity of the sludge, the generation of excess sludge can be controlled to the maximum. Therefore, it is not necessary to perform the steps of concentrating, digesting, dehydrating, composting, and incinerating the excess sludge. Thus, treatment equipment can be simplified and costs can be reduced.

Figure 2:
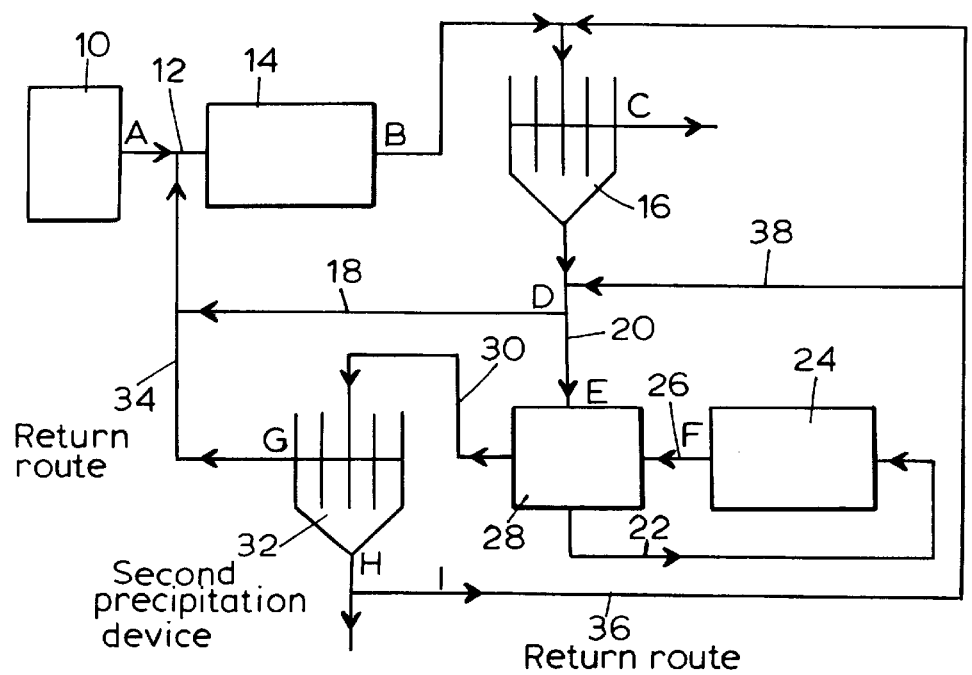
FIG. 2 is a schematic diagram showing an activated sludge treatment apparatus and method according to a second embodiment of the present invention.

FIG. 2 is a schematic diagram showing an activated sludge treatment apparatus and method according to a second embodiment of the present invention. The same reference numerals as those in the first embodiment of FIG. 1 basically denote corresponding portions.

The second embodiment is different from the first embodiment in that a second precipitation device 32 is provided on return route 30 for returning treated solution F solubilized by solubilizing treatment device 24 to aeration tank 14. More specifically, treated solution F is solid-liquid separated in second precipitation device 32. Treated solution G acting as a supernatant solution joins route 12 through a return route 34, and is introduced into aeration tank 14 together with organic waste water A so that aerobic biological treatment is performed. As described above, a treatment cycle is repeated. On the other hand, an excess sludge H which is a precipitate obtained by solid-liquid separation in second precipitation device 32 is properly subjected to concentration, digestion, dehydration, composting, and incineration.

Second precipitation device 32 is provided because insoluble inorganic matter or biologically undecomposable matter can accumulate in a treatment system depending on characteristics of the waste water to be treated. In particular, because an accumulation of insoluble inorganic matter can increase the specific gravity of a sludge, which is preferable with respect to prevention of bulking. However, excessive accumulation causes a reduction in activity per unit of sludge. Therefore, when an ash content per unit sludge dry weight exceeds 40%, a portion of the sludge usually is removed as an excess sludge.

Since excess sludge H has passed through a high temperature vessel, it contains only a small quantity of dissolved gases, and is excellent in sedimentation. Therefore, precipitation can be performed easily. Furthermore, excess sludge H has passed through the high temperature vessel such that pathogenic bacteria are destroyed. For this reason, composting can be performed quickly with fewer forms of bacteria. When several forms of bacteria are present, they require nutrients to develop, even if useful compost bacteria are added as starter. Therefore, the nutrient is exhausted before the compost bacteria can fully develop. Consequently, efficiency is reduced. According to the present invention, because compost bacteria are combined with destroyed bacteria, only the compost bacteria can develop. Thus, the composting efficiency can be increased.

If a portion I of excess sludge H is returned to first precipitation device 16 through a return route 36 or is returned to route 20 through a return route 38 in order to lessen a burden on precipitation device 16, the biologically undecomposable matter can be decomposed further by solubilizing treatment device 24. Therefore, generation of the excess sludge can be prevented further. In this case, the quantity of excess sludge I to be returned can be determined depending on a time taken for decomposing the biologically undecomposable matter.

Figure 3:
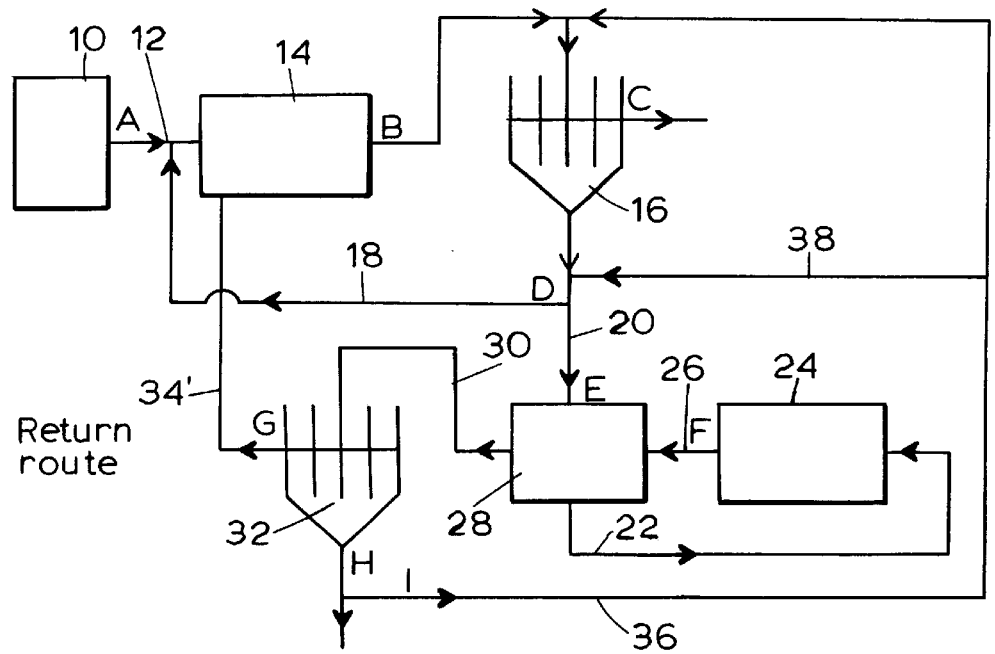
FIG. 3 is a schematic diagram showing an activated sludge treatment apparatus and method according to a third embodiment of the present invention.
Figure 4:
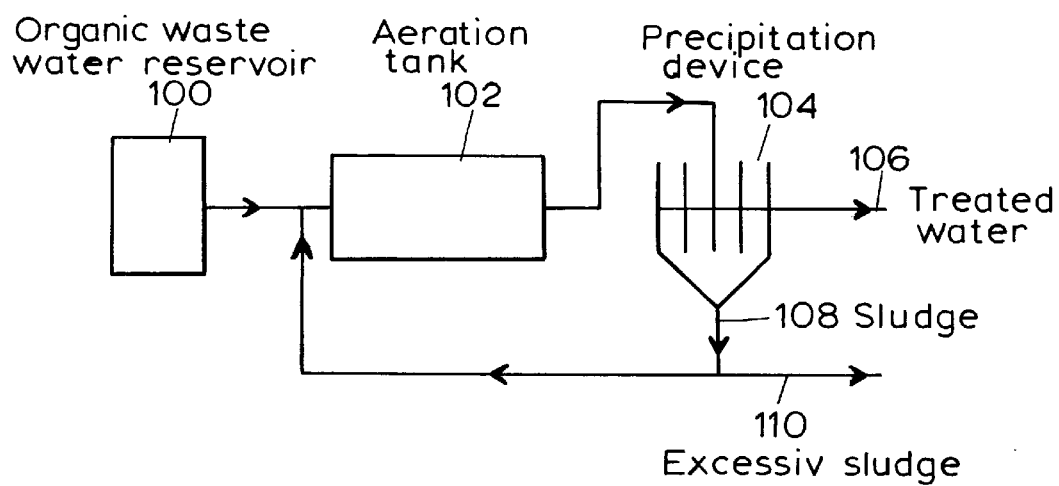
FIG. 4 is a schematic diagram showing an activated sludge method according to the prior art.

FIG. 3 is a schematic view showing an activated sludge treatment apparatus and method according to a third embodiment of the present invention. The same reference numerals as those in the second embodiment of FIG. 2 basically denote corresponding portions.

The third embodiment is different from the second embodiment in that treated solution G acting as a supernatant solution is returned to an intermediate portion of aeration tank 14 through a return route 34' instead of joining route 12 through return route 34 and being introduced into the aeration tank 14 with organic waste water A to perform the aerobic biological treatment. In the case where aeration tank 14 has a plug flow, a load of an inlet portion of aeration tank 14 is increased if a matter solubilized by solubilizing treatment device 24 is returned to the inlet portion of aeration tank 14. Therefore, a separate injection is used to reduce the load of the inlet portion of aeration tank 14. It is apparent that the foregoing can also be applied to the first embodiment.

Example 1

By using a cylindrical reaction vessel of a jacket type for circulating a heat medium formed of stainless steel and having an inside diameter of 150 mm (millimeter) and a height of 1 m (meter), operation was performed at a temperature of 70° C. with an aeration volume of 0.1 vvm, (vvm=aeration volume per effective volume per minute), and an effective volume of 10 L (liters). A treated sludge was an excess sludge discharged from a sewage treatment plant (a solid concentration (SS)=2.4%, a volatile organic matter concentration (VSS)=85%). An excess sludge 3.2 L was added to seeding sludge 0.8 liter every four days. For a residence time of five days, about 50% of the solid (VSS of 60%) was solubilized and 50% of VM (volatile matter) which is a character of organic matter was also removed at the same time.

When the treated sludge was introduced into an aeration vessel as shown in FIG. 1, it was observed that the quantity of generated excess sludge was decreased.

According to the activated sludge treatment method and apparatus of present invention, the organic waste water is subjected to the aerobic biological treatment, the treated solution then is separated into treated water and sludge, and the excess sludge is thereafter solubilized at a high temperature and is subjected to the aerobic biological treatment again. Consequently, the present invention can have remarkable and novel functions and effects.

(1) After the excess sludge is solubilized, the aerobic biological treatment is performed. Therefore, the quantity of generated excess sludge can be reduced greatly. The steps of concentrating, digesting, dehydrating, composting, and incinerating the excess sludge can be avoided as much as possible. Consequently, equipment can be simplified and costs can be reduced.

(2) With a structure wherein a second precipitation device is provided on the return route for returning the treated solution solubilized by the solubilizing treatment device to the aeration tank, it is possible to prevent excessive accumulation of insoluble inorganic matter, which in turn causes a reduction in activity per unit sludge. Therefore, when an ash content exceeds 40%, a portion the sludge can be removed as excess sludge. Consequently, the activity per unit sludge is not reduced.

(3) Even if excess sludge is generated, precipitation can be performed easily because the excess sludge has less dissolved gases and excellent sedimentation properties by passing through a solubilizing treatment device acting as a high temperature vessel. Furthermore, since the excess sludge passes through the high temperature vessel, pathogenic bacteria are destroyed. Therefore, a small quantity of different bacteria exist so that composting can be performed quickly.

(4) A portion of the excess sludge is returned to the first precipitation device through the return route. Therefore, the biologically undecomposable matter can further be decomposed by the solubilizing treatment device. Consequently, the generation of excess sludge can be prevented further.

(5) With a structure having a heat exchanger for heating the excess sludge which is solid-liquid separated by the precipitation device with the treated solution solubilized by the solubilizing treatment device, a heat loss can be reduced as much as possible.

Although the present invention has been fully described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. An activated sludge treatment apparatus for treating an organic waste water, comprising:

an aeration tank for subjecting the organic waste water to an aerobic biological treatment to form a treated waste water;

a first precipitation device operatively connected to the aeration tank for separating the treated waste water into treated water and a sludge;

a recycle route for returning a portion of the sludge from the precipitation device to the aeration tank;

the improvement which comprises a solubilizing treatment device operatively connected to the precipitation device for solubilizing the remaining portion of the sludge from the precipitation device by thermophilic bacteria to form a treated solubilized solution; and a return route for returning the treated solubilized solution from the solubilizing treatment device to the aeration tank.

2. The activated sludge treatment apparatus of claim 1 wherein a heat exchanger is positioned in a route leading from the precipitation device to the solubilizing treatment device, wherein the heat exchanger heats the sludge exiting the precipitation device with the treated solubilized solution exiting the solubilizing treatment device.

3. The activated sludge treatment apparatus of claim 1 comprising a second precipitation device for separating the treated solubilized solution exiting from the solubilizing treatment device into a treated water to be returned to the aeration tank and an excess sludge, wherein said second precipitation device is positioned in the return route for returning the treated solubilized solution to the aeration tank, further comprising an excess sludge return route for returning a portion of the excess sludge from the second precipitation device to the first precipitation device.

4. An activated sludge treatment method for treating an organic waste water comprising the steps of:

(a) subjecting the organic waste water to an aerobic biological treatment in an aeration tank to form a treated waste water, then separating the treated waste water into treated water and a sludge in a first precipitation device;

(b) returning a portion of the sludge separated by the precipitation device to the aeration tank through a recycle route;

(c) the improvement which comprises solubilizing, by thermophilic bacteria, the remaining excess sludge portion separated by the precipitation device in a solubilizing treatment device to form a treated solubilized solution; and (d) returning the treated solubilized solution to the aeration tank through a return route.

5. The activated sludge treatment method of claim 4 wherein the sludge that exits the first precipitation device is heated with the treated solubilized solution exiting the solubilizing treatment device through a heat exchanger positioned on a route leading from the first precipitation device to the solubilizing treatment device.

6. The activated sludge treatment method of claim 4 wherein the treated solubilized solution is separated in a second precipitation device into treated water to be returned to the aeration treatment device and an excess sludge, wherein the second precipitation device is positioned in the return route for returning the treated solubilized solution to the aeration tank, and a portion of the excess sludge from the second precipitation device is returned to the first precipitation device through an excess sludge return route.

7. At The activated sludge treating method of claim 4 wherein the solubilizing treatment device is operated at a temperature of 50° C. to 90° C.

* * * * *